ELECTRONIC MULTIPLEX TO START-STOP EXTENSOR

Filed Oct. 15, 1948 4 Sheets-Sheet 1

INVENTOR
RANSOM D. SLAYTON
BY Emery Robinson
ATTORNEY

Jan. 2, 1951 R. D. SLAYTON 2,536,578

ELECTRONIC MULTIPLEX TO START-STOP EXTENSOR

Filed Oct. 15, 1948 4 Sheets-Sheet 2

INVENTOR
RANSOM D. SLAYTON
BY Emery Robinson
ATTORNEY

Jan. 2, 1951 R. D. SLAYTON 2,536,578

ELECTRONIC MULTIPLEX TO START-STOP EXTENSOR

Filed Oct. 15, 1948 4 Sheets-Sheet 3

INVENTOR
RANSOM D. SLAYTON
BY Emery Robinson
ATTORNEY

Jan. 2, 1951 R. D. SLAYTON 2,536,578

ELECTRONIC MULTIPLEX TO START-STOP EXTENSOR

Filed Oct. 15, 1948 4 Sheets-Sheet 4

INVENTOR
RANSOM D. SLAYTON
BY Emery Robinson
ATTORNEY

Patented Jan. 2, 1951 2,536,578

UNITED STATES PATENT OFFICE 2,536,578

ELECTRONIC MULTIPLEX TO START-STOP EXTENSOR

Ransom D. Slayton, Lombard, Ill., assignor to Teletype Corporation, Chicago, Ill., a corporation of Delaware Application October 15, 1948, Serial No. 54,776

9 Claims. (Cl. 178—2)

Figure 1:
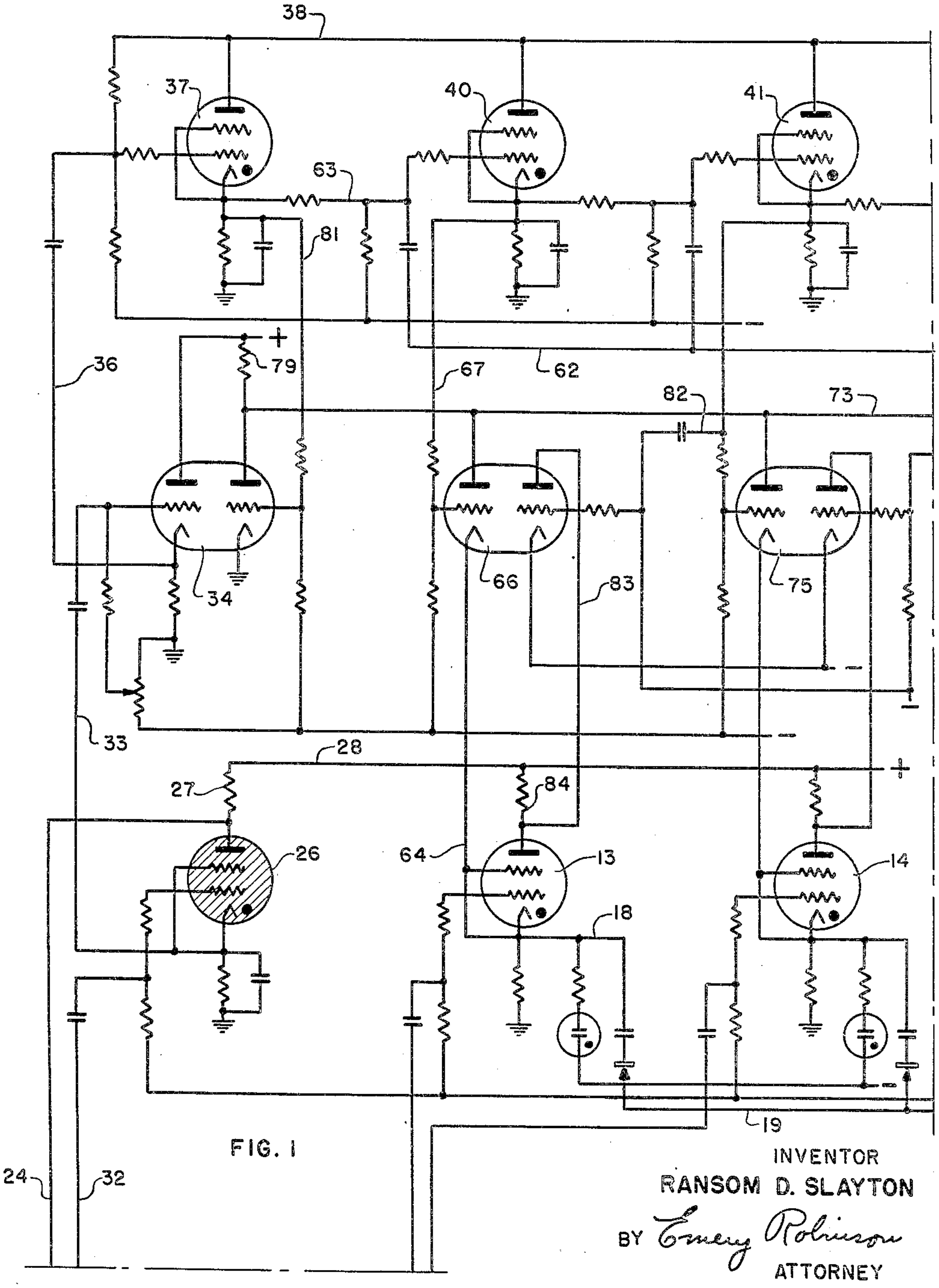
Figure 2:
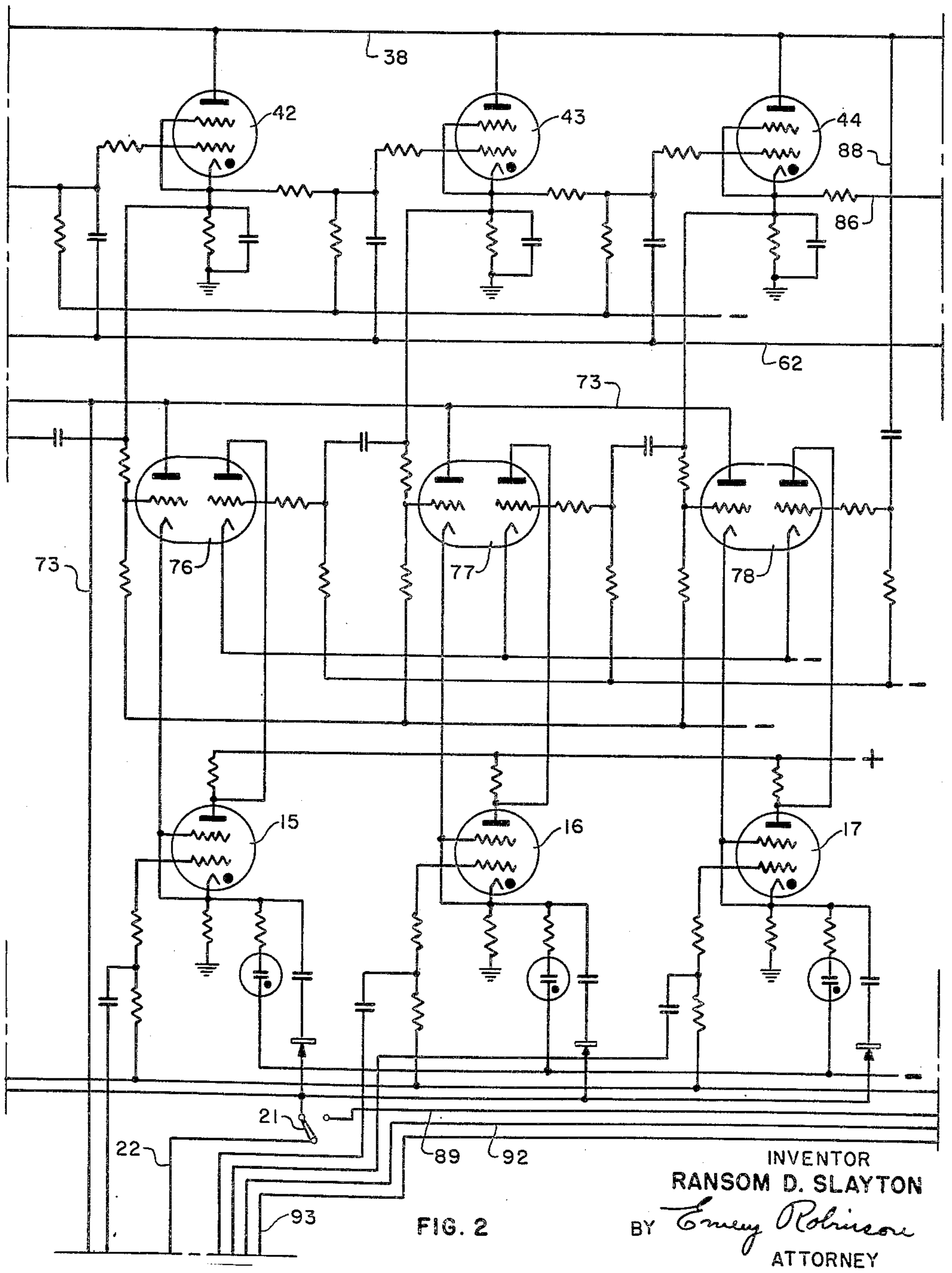
Figure 3:
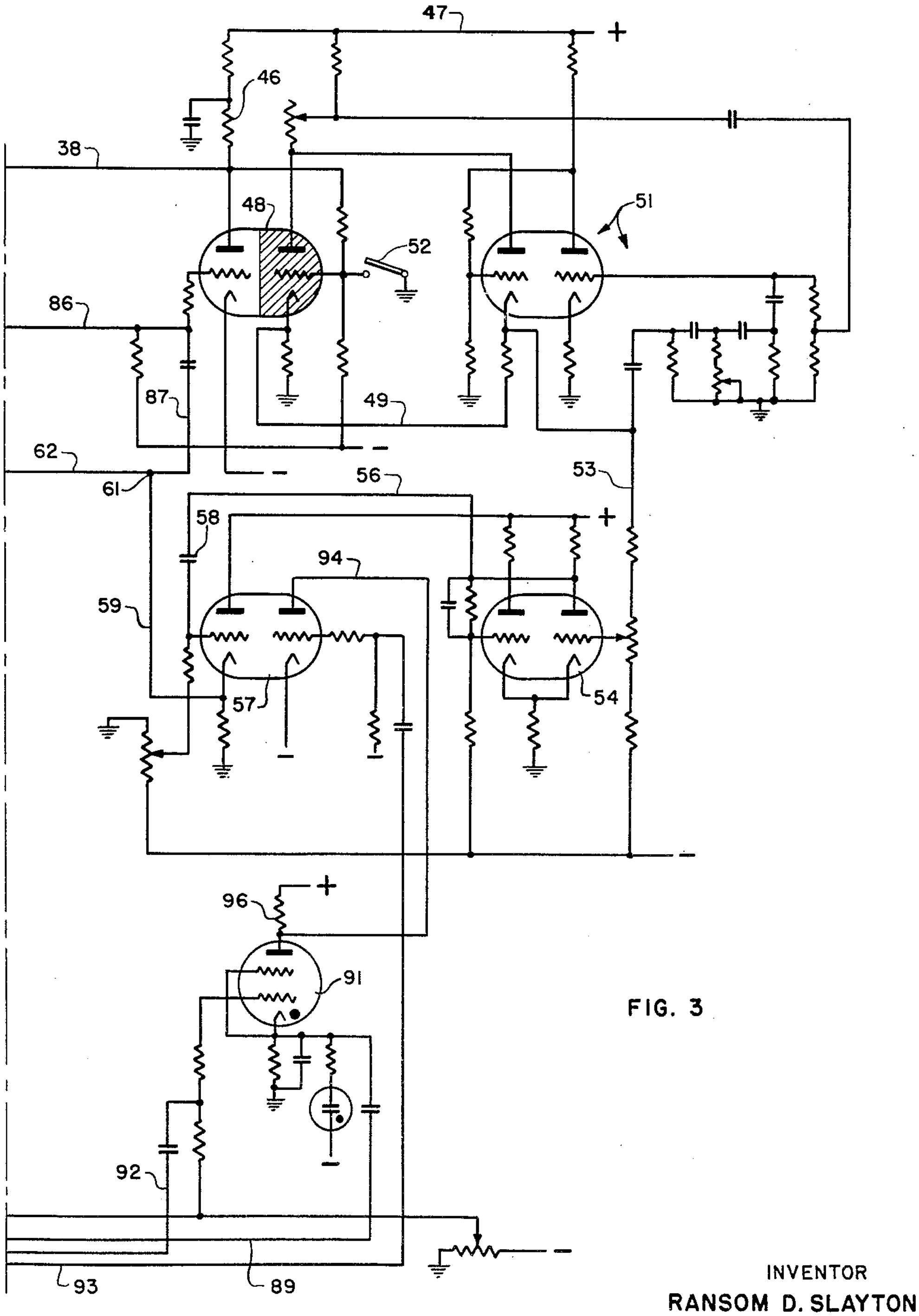

The present invention relates to converters and more particularly to an electronic converter for transposing multiplex to start-stop telegraph code signals.

The use of converters for transposing a multiplex to start-stop code is not new in telegraph practice, it being done in many systems now in operation. The need for such conversion often occurs through the use of start-stop terminal equipment and multiplex linking channels wherein there are not sufficient individual start-stop circuits between the terminals and it is found more desirable to use multiplexing facilities with each channel occupying only a portion of the usable circuit time. Also, the present trend of printing telegraph equipment is in the use of start-stop terminal equipment.

The prior known and utilized converters are mainly mechanical in nature and require a considerable amount of adjusting and regulating in order to operate efficiently. Further, in the use of mechanical apparatus there is constant wear and deterioration of parts, while mechanical characteristics place a limit to the speed of operation and accuracy of such devices.

Accordingly, an object of the present invention is to provide a multiplex to start-stop converter utilizing electronic devices as much as possible.

Another object of the invention is to provide an electronic multiplex to start-stop converter which is low in initial cost and is free from the requirement of repeated adjusting.

Yet another object of the invention is to provide a converter which has few mechanical limitations.

A further object of the invention is to provide a converter having no elements operating during a period of failure of the associated multiplex circuit.

A further object of the invention is to provide an electronic converter utilizing a start-stop chain distributor controlled by a start-stop oscillator, which will not be released for operation except upon the receipt of a code signal.

Another object of the present invention is to provide a converter which under one setting will not be responsive to blank code signals but which under a second setting will receive and respond to the reception of blank code signals.

The converter, in general, comprises a series of selector tubes which are responsive to the multiplex impulses received by multiplex receiving apparatus, and which operate to store such impulses. A start-stop oscillator is released for operation through means operating in response to the reception of a code signal to control a start-stop distributor of the chain type. The electronic distributor operates in conjunction with the selector tubes to control a plurality of mixer tubes for impressing the multiplex signals to the start-stop line but with the addition of automatically inserted start and stop impulses. Under a second condition provision is made for the release of the start-stop oscillator even though a blank signal has been received, which under the above first condition would not release the oscillator for operation.

Figure 4:
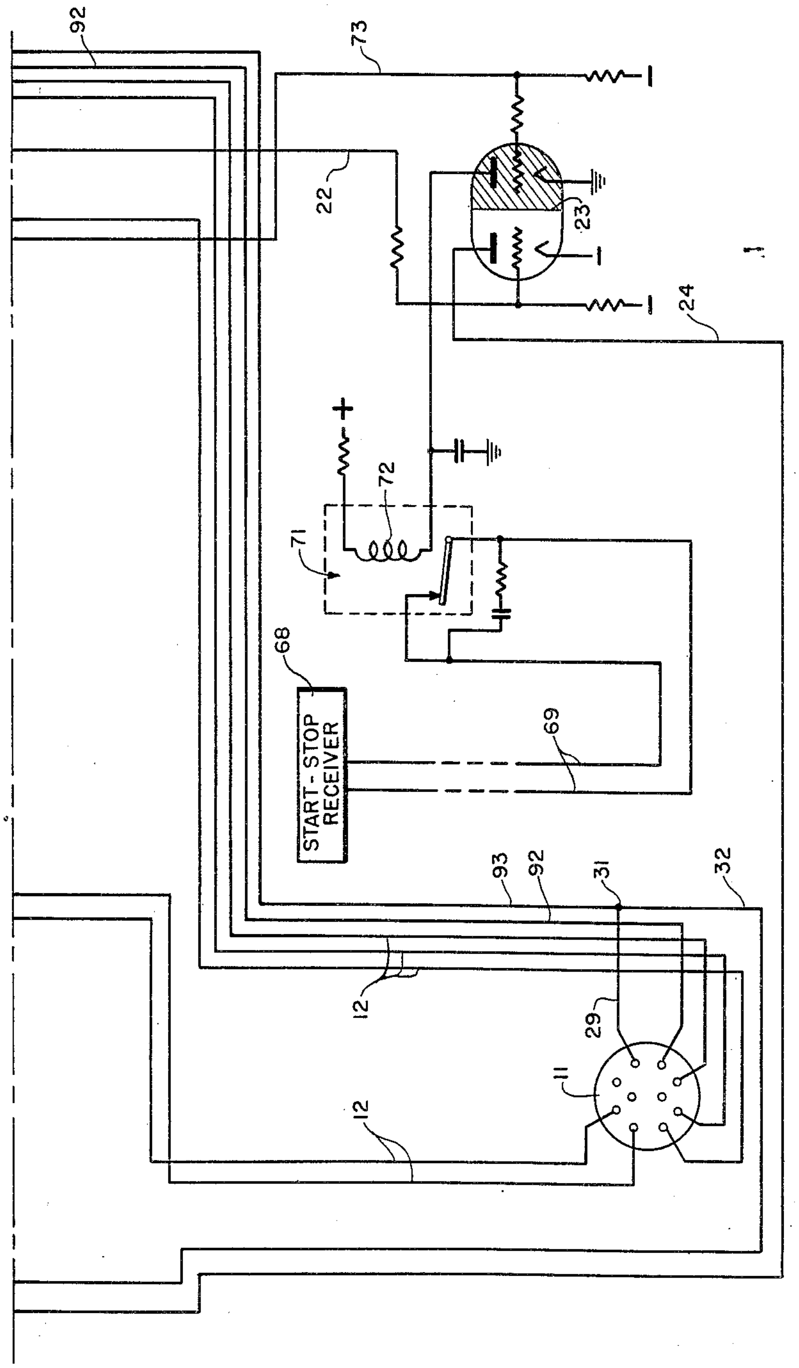
Figure 5:
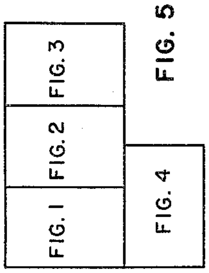

A more complete understanding of the invention may be had by reference to the following detailed description thereof when read in conjunction with the accompanying drawings, in which:

Figs. 1 to 4, inclusive, illustrate diagrammatically the components forming the present invention, and Fig. 5 illustrates in block diagram the correct positioning of Figs. 1 to 4, inclusive, to form an operative apparatus.

Referring to Fig. 4, a connector 11 is provided which is to be connected to an associated connector in the multiplex receiving distributor apparatus in conjunction with which the present apparatus is operating. Connected to the connector are five conductors 12 which connect with the receiving distributor output for the instant channel, such conductors being connected in the well known mechanical multiplex system to the five receiving segments assigned to the code signal for the instant channel. The conductors 12 may also be connected to the conductors 1726 of the electronic receiving multiplex distributor disclosed in copending application Serial No. 54,772, filed on October 15, 1948, in the name of T. A. Hansen. If such latter connections are made the connector 11 will be connected with the connector 2003 in the cited application.

The conductors 12 are connected separately through individual condensers and resistors to the normally negatively biased control grids of a plurality of gas filled selector tubes 13 to 17, inclusive. These tubes are of the type which once rendered conducting will continue to conduct irrespective of grid bias until an alteration occurs in the anode or cathode circuit thereof. Therefore, as the individual impulses are received by the receiving multiplex apparatus and relayed to the instant apparatus over the conductors 12, they will cause the tubes 13 to 17, inclusive, to be rendered conducting or not conducting in accordance with whether a marking or spacing impulse, respectively, is received.

Upon any of the tubes 13 to 17, inclusive, being rendered conducting, positive potential will be impressed from its output cathode circuit over a branching conductor, such as 18 associated with the tube 13, and through a condenser and a varistor or crystal rectifier to a common conductor 19. The common conductor 19 is connected through a manually operable switch 21 and over a conductor 22 to the normally negatively biased grid of the normally nonconducting left-hand blank deleter control portion of a twin vacuum triode 23. The left-hand portion of the tube 23 will be momentarily rendered conducting by a positive impulse at this time. The switch 21 may be positioned in one of two positions, but the present description will be completed with the assumption being made that it is connected to the conductor 19 as is illustrated. After the description is completed, a further description will be given with the switch 21 in its alternate position.

The anode of the left-hand portion of the tube 23 is connected by means of a conductor 24 to the anode of a gas filled start control tube 26 and thence through a common anode resistor 27 and over a conductor 28 to a source of positive battery. The tube 26 is normally in a conducting condition as will appear hereinafter and therefore through the use of the common anode resistor 27 will be extinguished by the left-hand portion of the tube 23 being rendered conducting. If it is desired to obtain a complete description of the known theory and operation of the extinguishment of tubes through the use of common anode resistors, the same may be had by reference to U. S. Patent No. 2,412,642 issued to Wilkerson on December 17, 1946, wherein a complete and detailed description is given. The left-hand portion of the tube 23 will again become momentarily conducting when any of the other gas filled selector tubes 13 to 17, inclusive, are rendered conducting by a marking impulse occurring in the same code sequence. Tube 26 will be extinguished by the first marking selection in a code sequence and then will remain extinguished regardless of further conduction or nonconduction by tube 23.

After the complete signal has been received by the receiving multiplex apparatus, which signal consists of five impulse intervals, and such signal is stored in the selector tubes 13 to 17, inclusive, a multiplex operating pulse will be directed to the instant apparatus through the connector 11 to a conductor 29. Such multiplex operating pulse may originate from a local segment if a segmented mechanical distributor is utilized, which is used and well known in present practice. However, if the system disclosed in the mentioned T. A. Hansen application is utilized in conjunction with the present converter with the connector 11 connected to the connector 2003 the conductor 29 will be connected to the conductor 2006.

The positive multiplex operating pulse will be impressed from the conductor 29 to a junction point 31 and thence over a conductor 32 to the normally negatively biased grid of the start tube 26. Such impulse will cause the tube 26 to be rendered conducting.

Upon the tube 26 again being rendered conducting, positive potential will be impressed from its output cathode circuit over a conductor 33 and through a condenser to the normally negatively biased grid of the normally nonconducting left-hand start pulse amplifier portion of a twin vacuum triode 34. The left-hand portion of the triode 34 will be rendered conducting. It might be noted that because of the condenser in the conductor 33 a pulse only will be supplied to the grid of the left-hand portion of the tube 34 and that therefore such portion will conduct momentarily only.

During the interval of conduction of the left-hand portion of the tube 34, a positive potential impulse will be impressed from its output cathode circuit over a conductor 36 and through a suitable condenser and resistor to the moderately negatively biased control grid of a normally nonconducting gas filled start tube 37, causing the latter to conduct. The anode of the tube 37 is connected by a common conductor 38 to the anodes of five gas filled distrbutor tubes 40 to 44, inclusive, and through a common anode resistor 46 and over a conductor 47 to a source of positive potential. The drop in potential of conductor 38 now also causes more negative bias to be applied to the control grid of tube 37, preventing the tube from again being rendered conducting until the potential of conductor 38 again rises; however, the tube 37 is not rendered nonconducting at this time, but at the time that the tube 40 is rendered conducting, as will be described.

Prior to the time that the start tube 37 was rendered conducting, positive potential had been supplied over the conductor 47 and through the common anode resistor 46 to the normally negatively biased grid of the right-hand oscillator control portion of a twin vacuum triode 48. Under this condition, with positive bias on the grid of the tube, the right-hand portion thereof is rendered conducting and continues in that state until the tube 37 is rendered conducting; the potential drop through common anode resistor 46 then removing the positive bias from the grid. At the time that the right-hand portion of the tube 48 is conducting positive potential is impressed from its output cathode circuit over a conductor 49 to the left-hand portion of a start-stop oscillator indicated generally by the numeral 51. No detailed description of the start-stop oscillator nor its operation will be given at this time as the same may be had by reference to U. S. Patent No. 2,373,737, issued on April 17, 1945, to M. Artzt, wherein a complete description may be found. Also, the right-hand portion of tube 48 has its anode connected to the anode of the left-hand portion of the oscillator 51 and, therefore, when the tube 48 conducts its low anode potential reduces the gain of the oscillator tube 51 which will thus be doubly blocked and prevented from operating.

It might be noted at this time that a normally open manually operable switch 52 is connected to ground and associated with the grid of the right-hand portion of the tube 48. If the switch 52 were to be closed, placing the grid at ground potential, the right-hand portion of the tube 48 will be rendered nonconducting and the start-stop oscillator 51 will be released for operation. The distributor would not operate unless a start impulse were received from control tube 26. This allowance of free running of the oscillator 51 is provided so that the oscillator may be calibrated and adjusted to its desired frequency output. Such a frequency measurement may be made by applying the continuous signal to the input terminals of a cathode-ray oscilloscope along with the signals from a source of known frequency. A variable resistor in the oscillator circuit 51 allows frequency adjustment.

Referring again to the fact that the tube 37 was rendered conducting and the right-hand portion of the tube 48 was rendered nonconducting, no further potential will be impressed on the conductor 49 to block operation of the start-stop oscillator 51. The oscillator 51 will, therefore, commence to operate with its sine wave output being directed over a conductor 53 to the normally negatively biased grid of the right-hand portion of a twin triode squaring amplifier vacuum tube 54. The two portions of the tube 54 will operate in a manner well known in the art to direct a square wave over a conductor 56 to the normally negatively biased grid of the left-hand amplifier portion of a twin vacuum triode 57 through a condenser 58. The condenser 58 modifies the transition points of the square wave to positive and negative impulses with the left-hand portion of the tube 57 conducting in response to the positive impulses. The left-hand portion of the tube 57 will thus amplify a succession of positive pulses which occur in accordance with the transition points of the sine wave output of the oscillator, and which will be impressed over a conductor 59 to a junction point 61 and thence over a common conductor 62 to the control grid circuits of the distributor tubes 40 to 44, inclusive.

During the interval that the start tube 37 is conducting, positive potential is impressed from its output cathode circuit and through suitable resistors over a conductor 63 to the normally well negatively biased control grid of the distributor tube 40. The tube 40 will not be rendered conducting at this time, however, as this potential on its control grid is not sufficient to raise the grid to a value allowing conduction. However, this potential will exist during the interval that the tube 37 conductors and may be considered as a conditioning potential. The conditioning potential does not appear instantaneously at the grid of tube 40, but is delayed by the necessity of charging the grid condenser through the resistor network.

As it was just mentioned that the start-stop oscillator 51 is released for operation upon the rendering conductive of the tube 37, upon the first positive impulse being impressed upon the conductor 62 from the squaring tube 54 and the amplifying left-hand portion of the tube 57, an operating potential will be impressed through a suitable condenser and resistor to the control grids of all of the tubes 40 to 44, inclusive. However, at this time the tube 40 will be the only tube receiving a conditioning potential on its control grid and therefore will be the only tube of the group which will be rendered conducting. As the tube 40 is rendered conducting it extinguishes the tube 37 by means of the common anode resistor 46.

The remaining tubes 41 to 44, inclusive, are interconnected with their preceding tube in a manner as the tube 40 is connected to the tube 37 so that at such time as any of the tubes 40 to 43, inclusive, are conducting, they supply conditioning potential to the control grid of their associated succeeding tubes 41 to 44, inclusive. With conditioning potential being applied to the grid of one of these tubes, that particular tube will be rendered conducting upon the receipt of the next distributor drive impulse on the conductor 62. The tubes 40 to 44, inclusive, will operate successively as described and thus form an electronic chain distributor.

It was mentioned previously that the tubes 13 to 17, inclusive, were in a conducting or nonconducting state in accordance with the particular received multiplex impulse received therein, the tube being conducting if a marking impulse and nonconducting if a spacing impulse. If it be assumed that marking condition is stored in the selector tube 13, it will be conducting and positive potential will be impressed from its output cathode circuit over a conductor 64 to the cathode of the left-hand mixer portion of a twin vacuum triode 66. If, conversely, it be assumed that a spacing condition is registered in the tube 13, such tube will not be conducting and no potential will be impressed on the conductor 64, the cathode of the left-hand portion of the tube 66 then being at ground potential.

During the interval of conduction of the tube 40 positive potential will not only be impressed from its ouput cathode circuit to the control grid of its succeeding tube 41 but also will be impressed over a conductor 67 and through an appropriate resistor to the normally negatively biased grid of the left-hand portion of the tube 66. Upon such potential being impressed upon the grid, if the No. 1 selector tube 13 is conducting at this time the left-hand portion of the tube 66 will be prevented from being rendered conducting by positive potential being impressed on its cathode, or conversely if the tube 13 is not conducting with no potential being impressed on the conductor 64, the left-hand portion of the tube 66 will be rendered conducting.

By reference to Fig. 4, it may be seen that a start-stop receiving device or recorder indicated generally by the numeral 68, which may be located either locally or at a distant point, is connected over conductors 69 to the contacts associated with a mechanical line relay indicated generally by the numeral 71. The operating winding 72 of the line relay is connected to battery on one side and on the other side to the anode of the normally conducting right-hand output mixer portion of the tube 23. The relay 71 is so biased that during the normal conducting condition of the right-hand portion of the tube 23, a marking or current carrying condition will exist on the conductors 69, the battery being supplied at the receiver 68. The normal condition of battery or marking on the line is well known, and is utilized in start-stop telegraphy in order that a recording device may be held in an unoperative condition during intervals when no signals are being transmitted over the line.

The grid of the right-hand portion of the tube 23 is connected through a resistor to negative battery, and also by means of a conductor 73 connects to the anode of the left-hand portion of the tube 66 and also to the anodes of the left-hand mixer portions of twin vacuum triodes 75, 76, 77, and 78. Further, the conductor 73 connects to the anode of the right-hand start mixer portion of the tube 34, and thence through a common anode resistor 79 to a source of positive battery. During the interval that the right-hand portion of the tube 34 and the left-hand portions of the tubes 66 and 75 to 78, inclusive, are not conducting, positive potential will be applied from the source of battery through the common anode resistor 79 and over the conductor 73 to supply positive bias to the grid of the right-hand portion of the tube 23. This is the normal condition for the various mentioned tubes and allows the relay 71 to be positioned through the conduction of the right-hand portion of the tube 23 to supply marking battery to the line conductors 69.

It is to be remembered at this time that it was mentioned that with a signal stored in one or more of the selector tubes 13 to 17, inclusive, that upon receipt of the multiplex operating pulse over the conductors 29 and 32, that the tube 26, the left-hand portion of the tube 34, and the tube 37 were all rendered conducting. During the interval of conduction of the tube 37, which is equal to the start impulse interval, potential will be impressed from its output cathode circuit over a conductor 81 to the normally negatively biased grid of the right-hand portion of the tube 34. The right-hand portion of the tube 34 will be rendered conducting during this interval which through the use of the common anode resistor 79 will result in a drop in potential on the conductor 73 with a resulting rendering nonconducting of the right-hand portion of the tube 23. At this time the relay 71 through the cessation of current in its operating winding 72 will be biased or positioned to its opposite condition, opening the relay contacts and resulting in a no current or spacing condition on the conductors 69, which is indicative of a start condition or impulse in start-stop telegraphy.

It has also been described how after an appropriate interval the tube 40 will be rendered conducting with the extinguishing of the tube 37, and the impression of potential to the grid of the left-hand portion of the tube 66. Further, it was described that the left-hand portion of the tube 66 will be rendered conducting if a spacing condition exists for the No. 1 impulse interval as stored in the selector tube 13. If the left-hand portion of the tube 66 is now rendered conducting, a potential drop will occur on the conductor 73 which is connected to its anode and to the common anode resistor 79 which will cause a condition in the right-hand portion of the tube 23 and the relay 71 similar to the start impulse condition described immediately above. Under this condition a no current or spacing condition will exist on the conductors 69.

If, instead, a marking condition exists in the No. 1 selector tube 13 at the time that the tube 40 is conducting and impressing potential over the conductor 67 to the grid of the left-hand portion of tube 66, such portion will be blocked because of the positive potential impressed by the tube 13 over the conductor 64 to the cathode thereof. Under this condition a potential rise will occur from the positive source of battery and through the common anode resistor 79 to the conductor 73 thereby allowing the right-hand portion of the tube 23 to be once again rendered conducting. Upon this occurrence the relay 71 will be positioned so as to apply battery or a marking condition to the conductors 69, similar to the stop condition described initially.

The tube 40 will remain conducting for an interval equal to the normal length of a signal impulse and thereafter upon the receipt of the next pulse from the oscillator 51 to the conductor 62 the tube 41 will be rendered conducting with the tube 40 extinguished; all as described above. In the event that the left-hand portion of the tube 66 had been conducting signifying a marking condition, it will be rendered nonconducting at the time that the tube 40 is extinguished as it is a vacuum tube.

Upon the tube 41 being rendered conducting its output cathode potential will be impressed to the grid of the left-hand portion of the tube 75 in a similar manner to that described above. The tube 75 will respond or not respond in accordance with the impulse stored in the tube 14 in a manner also similar to that described with respect to the tube 66.

At the instant that the tube 41 first conducts, positive potential will also be impressed from its output cathode circuit to a conductor 82 and through a condenser and resistor to the normally negatively biased grid of the right-hand release portion of the tube 66. This will cause the right-hand portion of the tube 66 to be rendered momentarily conducting. The anode of the right-hand portion of the tube 66 is connected by a conductor 83 to the anode of the tube 13 and thence through a common anode resistor 84 and over the conductor 28 to the source of positive potential. Thus, upon the right-hand portion of the tube 66 being rendered momentarily conducting, the tube 13 will be extinguished, assuming that it had been conducting, through the use of the common anode resistor 84.

The tube 41 will remain conducting for an interval equal to a signal impulse and thereafter the tubes 42 to 44, inclusive, will conduct in chain fashion for predetermined intervals as described. During the intervals of conduction of the tubes 42 to 44 the left-hand mixer portions of the selector tubes 76 to 78 will be rendered conducting or nonconducting in accordance with the signal condition stored in the selector tubes 15 to 17. Also, during the interval of conduction of the tubes 41 to 44 and in accordance with whether the left-hand portions of the tubes 75 to 78 are rendered conducting or not conducting a similar condition will be reflected on the conductor 73 to control the right-hand portion of the tube 23 and the output line relay 71 in accordance with prior descriptions. Also at the instants of conduction of tubes 42 to 44, the right-hand release sections of tubes 75 to 77 will be energized to extinguish tubes 14 to 16, if the latter had been previously conducting.

At such time as the tube 44 is rendered conducting, such tube being assigned to the No. 5 impulse interval, its output cathode circuit will impress potential through suitable resistors and over a conductor 86 to the normally negatively biased grid of the left-hand stop portion of the tube 48. The output pulses from the start-stop oscillator 51 which are squared and amplified and impressed on the conductor 59 to the junction point 61 are also impressed over a branching conductor 87 and through a condenser and resistor to the grid of the left-hand portion of the tube 48. Thus, with the grid of the left-hand portion of the tube 48 receiving a conditioning potential from the distributor tube 44, upon the receipt of the next distributor drive impulse, the left-hand portion of the tube 48 will be rendered conducting. This operating pulse is received after an interval of conduction of the tube 44 sufficient for the transmission of the No. 5 signal impulse. Upon the left-hand portion of the tube 48 being rendered conducting the tube 44 will be extinguished through the use of the common anode resistor 46.

The left-hand portion of the tube 48 will conduct momentarily only as it is a vacuum tube and receives but a single impulse through the condenser in the conductor 87 to its grid. However, such interval of conduction will be sufficient to extinguish the tube 44, as mentioned. As the left-hand portion of the tube 48 is rendered nonconducting, potential will rise on the conductor 38 through the common anode resistor 49 sufficiently to impress sufficient potential on the grid of the right-hand portion of the tube 48 to allow it to be rendered conducting. At this time potential is impressed from its cathode and anode circuits to block operation of the start-stop oscillator 51, as described previously.

Also, at such time as the left-hand portion of the tube 48 is rendered nonconducting and a potential rise exists on the conductor 38 a similar potential rise will exist on a branching conductor 88 which is connected through a condenser and resistor to the normally negatively biased grid of the right-hand portion of the tube 78. This will cause such portion of the tube to be rendered conducting for the purpose of extinguishing the No. 5 impulse selector tube 17 if it had been rendered conducting by the received signal. Threfore, it may be seen that while the right-hand release portions of the tubes 66 and 75 to 77, inclusive, are rendered conducting by the associated succeeding distributor tubes 41 to 44, inclusive, the right-hand portion of the tube 73 is operated under the control of the rendering nonconducting of the left-hand portion of the tube 48. Thus, at this time the selector tubes 13 to 17, inclusive, will all be in an extinguished condition awaiting operation in accordance with the next signal that is being received from the associated receiving multiplex distributor and impressed over the conductors 12. At this time upon the receipt of a marking impulse in any impulse position the apparatus will be re-energized as described above to release the start-stop distributor 51 and complete another cycle of operation.

It might be mentioned at this time that with the system operating as described above, if a blank signal were to be received from the receiving multiplex apparatus, which consists of five spacing impulses, none of the tubes 13 to 17, inclusive, would be rendered conducting. Under this condition the left-hand portion of the tube 23 would not be rendered conducting and the tube 26 would not be extinguished. Thereafter upon receipt of the next multiplex operating pulse over the conductors 29 and 32 to the control grid of the tube 26, the tube 26 would not be rendered conducting as it already is in that condition. Therefore, there would be no positive pulse impressed over its output conductor 33 and through its condenser to the grid of the left-hand portion of the tube 34. The left-hand portion of the tube 34 would not be rendered conducting which would result in no potential being impressed on the conductor 36 and the start tube 37 would not be rendered conducting. With the above condition occurring, the start-stop oscillator 51 will not be released for a cycle of operation and the converter apparatus will not operate to impress the blank signal on the conductors 69. Therefore, with the apparatus operating as described above, no blank signal conditions in the signal initiating means will be passed to the start-stop receiver 68.

If it now be assumed that the manually operable switch 21 be moved to its right-hand position, the conductor 22 will be connected through the switch 21 to a conductor 89 which extends to the output cathode circuit of a gas filled sixth pulse selector tube 91. The normally negatively biased grid of the tube 91 is connected through a suitable resistor and condenser and over a conductor 92 to the connector 11 which is connected to the multiplex receiving apparatus. Such position of the switch 21 is utilized in schemes of transmission where a sixth pulse is originated such as for instance in the transmission of cipher signals wherein the blank start-stop signal combination must be retransmitted. Under this scheme of operation a sixth pulse will be transmitted invariably from the transmitting apparatus to the receiving multiplex apparatus for each character combination including the blank and will then be passed over a conductor not shown to the connector 11 and the conductor 92. Therefore, each time that the sixth pulse is received over the conductor 92 it will be sufficient to overcome the negative bias on the control grid of the tube 91 and cause conduction in that tube. When such occurs, positive potential will be impressed from the output cathode circuit of the tube 91 over the conductor 89, through the then closed switch 21, and over the conductor 22 to the grid of the left-hand portion of the tube 23, causing such portion of the tube to be rendered momentarily conducting. During the prior description of the apparatus it was mentioned how when the left-hand portion of the tube 23 is rendered conducting, the apparatus will operate to cause the start tube 37 to be rendered conducting and the start-stop oscillator 51 to be released for a cycle of operations.

From the above condition it may be seen that the converter apparatus is released for a cycle of operation solely under the control of the sixth pulse and not under the control of a marking impulse in one of the five impulse positions. This may be amplified by reference to the switch 21 which no longer connects the conductor 22 to the common conductor 19 leading from the output circuits of the selector tubes 13 to 17, inclusive. Under this setting of the apparatus then it is obvious that the release of the converter is under the control of the sixth pulse only irregardless of the five signal impulses and, therefore, even though a blank signal condition may be received by the selector tubes 13 to 17, inclusive, the apparatus will be released to impress such condition to the conductors 69 for recordation at the receiver 68. As mentioned above the receipt of the sixth pulse is invariable to the converter apparatus upon the reception of each character combination originally presented to the multiplex by distant start-stop transmitting apparatus. It is not received when the channel is idle, or when a speed difference blank is inserted by the action of the distant transmitting converter.

It should be remembered at this time that it was stated earlier that after the signals had been received in the selector tubes 13 to 17, inclusive, that a multiplex operating pulse would be received at the connector 11 over the conductor 29 and to the junction point 31. In the event that the sixth pulse code is being utilized such multiplex operating pulse will not be received until immediately after both the five signal impulses and the sixth pulse have been impressed to the converter apparatus.

The multiplex operating pulse will be impressed from the junction point 31 over a conductor 93 to the normally negatively biased grid of the right-hand selector release portion of the tube 57. This portion of the tube will be rendered momentarily conducting at this time. The anode of the right-hand portion of the tube 57 is connected by means of a conductor 94 to the anode of the sixth pulse selector tube 91 and thence through a common anode resistor 96 to a source of positive potential. Thus, upon such time as the right-hand portion of the tube 57 is rendered conducting the sixth pulse selector tube 91 will be extinguished. However, the tube 91 will have previously served the purpose of releasing the converter apparatus for a cycle of operation and thereafter will be in readiness to respond to the sixth pulse of the succeeding signal.

While a specific embodiment of the invention has been illustrated and described it is obvious that the invention is not limited to such disclosure but that additions and modifications may be made thereto within the scope and spirit of the invention.

What is claimed is:

1. In a multiplex to start-stop converter, a start-stop distributor, a start-stop oscillator for operating said distributor, a plurality of tubes, each of which is assigned to one of the components of a multi-component received code signal, said tubes being rendered conducting in response to its component being marking, means jointly responsive to one of said tubes being rendered conducting and to a multiplex distributor for releasing said oscillator for operation, and means controlled by said tubes and said start-stop distributor for transmitting the signal components as stored in said tubes.

2. In a multiplex to start-stop converter, a start-stop distributor, a start-stop oscillator for operating said distributor, a plurality of tubes, each of which is assigned to one of the components of a multi-component received code signal, said tubes being rendered conducting in response to its component being marking, means jointly responsive to one of said tubes being rendered conducting and to a multiplex distributor for releasing said oscillator for operation, and means controlled by said start-stop distributor for extinguishing conducting ones of said tubes after the signal component stored therein has been retransmitted.

3. In a multiplex to start-stop converter, a start-stop distributor comprising a plurality of tubes, a start-stop oscillator to operate said distributor for causing said tubes to be rendered conducting successively, a plurality of tubes for storing received signal conditions, means jointly responsive to the storing of a signal condition in said plurality of storage tubes and to a multiplex distributor for releasing said oscillator for operation, a plurality of secondary tubes each of which is under the joint control of one of said storage tubes and one of said distributor tubes, means to retransmit signal conditions under the control of said secondary tubes, and means for inserting start and stop conditions to said retransmitting means for retransmission with said signal conditions.

4. In a multiplex to start-stop converter, a start-stop distributor, a start-stop oscillator for operating said distributor, code signal receiving means, a normally conducting tube, means responsive to the receipt of a code signal by said receiving means for extinguishing said normally conducting tube, means under the control of a multiplex distributor for rendering said extinguished tube conducting, means controlled by said tube being again rendered conducting for releasing said oscillator for operation, means controlled by said signal receiving means and said start-stop distributor for retransmitting the received signal conditions, and means for inserting start and stop conditions to said retransmitting means for retransmission with said signal conditions.

5. In a multiplex to start-stop converter, a start-stop distributor, a start-stop oscillator for operating said distributor, multiplex signal condition receiving means, means for receiving a sixth code pulse, means under the joint control of the receipt of a sixth code pulse in said sixth pulse receiving means and a multiplex distributor for releasing said oscillator for operation, means controlled jointly by said signal receiving means and said start-stop distributor for retransmitting the multiplex signal conditions, and means for impressing start and stop conditions on said means jointly controlled for retransmitting them with the multiplex signal conditions as start-stop signals.

6. In an electronic multiplex to start-stop converter, an electronic distributor comprising a plurality of tubes in a series, each of which conditions the succeeding tube, a start-stop oscillator to operate conditioned ones of said tubes successively, multiplex signal receiving means, means responsive to the receipt of a signal by said signal receiving means and to a multiplex distributor for rendering conducting the first of said tubes in the series and for releasing said oscillator for operation, signal utilization means under the joint control of said signal receiving means and said distributor tubes, and means controlled by the last tube in the series being rendered conducting for shutting off operation of said oscillator.

7. In a multiplex to start-stop converter, a start-stop distributor, a start-stop oscillator for operating said distributor, a plurality of tubes, each of which is assigned to one of the components of a multi-component received code signal, said tubes being rendered conducting in response to its component being marking, means jointly responsive to one of said tubes being rendered conducting and to a multiplex distributor for releasing said oscillator for operation, means controlled by said tubes and said start-stop distributor for transmitting the signal components as stored in said tubes, and means for inserting start and stop conditions to said transmitting means for transmission with the signal components.

8. In a multiplex to start-stop converter, a start-stop distributor, a start-stop oscillator for operating said distributor, a plurality of tubes, each of which is assigned to one of the components of a multi-component received code signal, said tubes being rendered conducting in response to its component being marking, means jointly responsive to one of said tubes being rendered conducting and to a multiplex distributor for releasing said oscillator for operation, means jointly responsive to the receipt of a control pulse and a multiplex distributor for releasing said oscillator for operation, means for selecting one or the other of said oscillator releasing means for operation, and means controlled by said tubes and said start-stop distributor for transmitting the signal components as stored in said tubes.

9. In a multiplex to start-stop converter, a start-stop distributor, a start-stop oscillator for operating said distributor, a plurality of tubes, each of which is assigned to one of the components of a multi-component received multiplex code signal, means for receiving a control pulse, means under the joint control of the receipt of the control pulse and a multiplex distributor for releasing said oscillator for operation, and means controlled by said tubes and said start-stop distributor for transmitting the signal components as stored in said tubes.

RANSOM D. SLAYTON.

REFERENCES CITED

The following references are of record in the file of this patent:

UNITED STATES PATENTS

| Number | Name | Date |
|---|---|---|
| 1,561,526 | Vernam | Nov. 17, 1925 |
| 1,880,906 | Duerr | Oct. 4, 1932 |
| 2,433,362 | Hartley | Dec. 30, 1947 |
| 2,438,492 | Bascom | Mar. 30, 1948 |